United States Patent Office 3,697,457
Patented Oct. 10, 1972

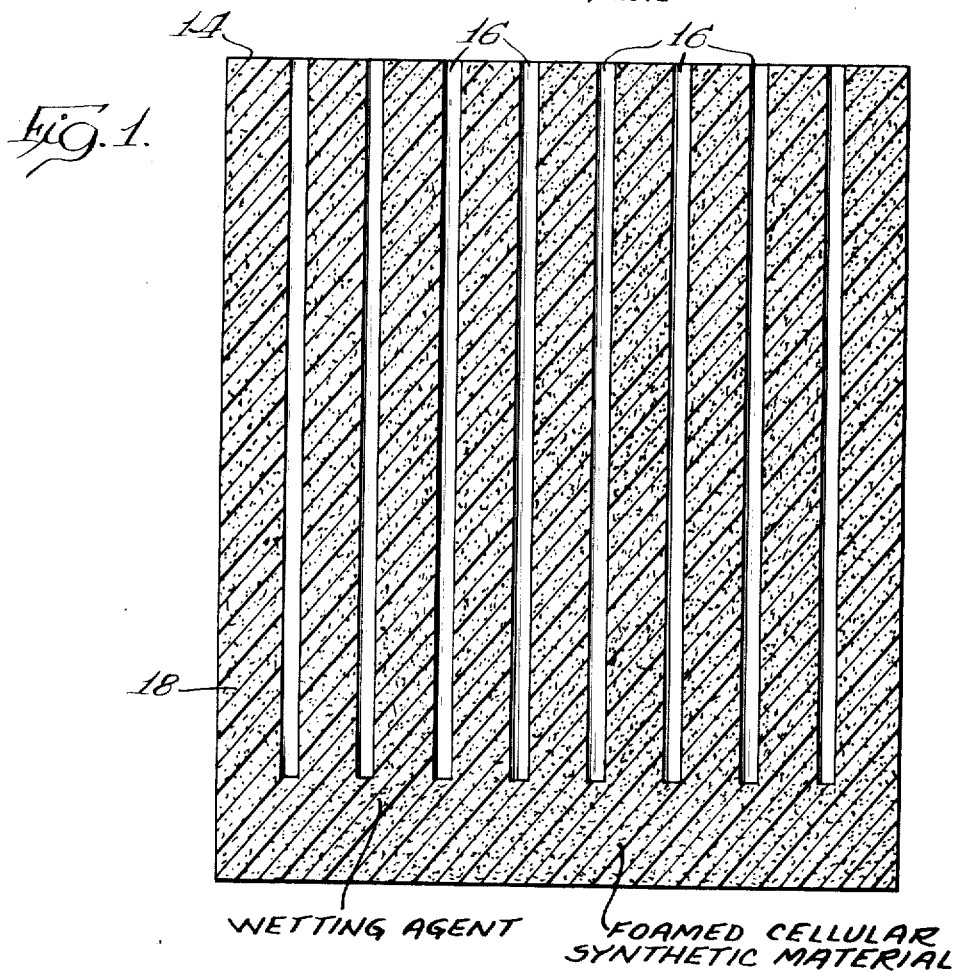
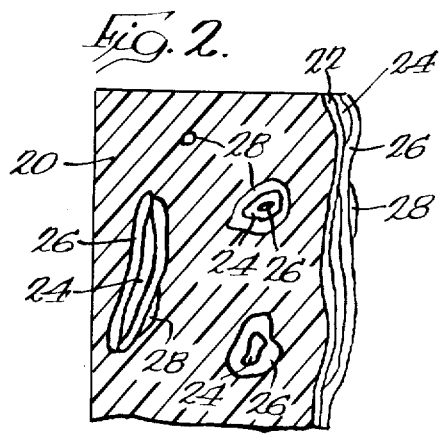

3,697,457
SELF-WETTING FOAM PRODUCT AND
METHOD OF MAKING SAME
Albert M. Palombo, Arlington, Mass., assignor to
American Poly-Plastics Laboratories, Inc.
Continuation-in-part of abandoned application Ser. No.
652,229, July 10, 1967. This application Mar. 17,
1971, Ser. No. 125,441
Int. Cl. C08v 1/16
U.S. Cl. 260—2.5 F
22 Claims

ABSTRACT OF THE DISCLOSURE

Solid self-wetting floral foam containing ammonium neutralized residue of mineral acid catalyst with interconnected cells having connately and generally uniformly distributed unreacted anionic sulfonate wetting agent content of 1½ to 3 weight percent isolated by nonionic wetting agent from the catalyst residue and the phenolic of the foam, manufactured by mixing phenolic resin and carbon black with nonionic wetting agent, mixing in the sulfonate, adding and mixing more nonionic wetting agent, foaming the mixture with mineral acid, recovering the resulting solid foam product, and neutralizing residual acid with ammonia to turn the foam from black to green.

The nonionic wetting agent and sulfonate wetting agent additions can be split into two additions so that a portion of the nonionic wetting agent is added followed by a portion of the sulfonate, the remainder of the nonionic and then the remainder of the sulfonate. This achieves faster wetting and maximum water absorption in the foam product.

CROSS REFERENCE TO RELATED APPLICATION

This application is a continuation-in-part of my application Ser. No. 652,229, entitled "Floral Foam and Method of Making Same," filed July 10, 1967, now abandoned.

BACKGROUND OF THE INVENTION (1) Field of the invention

This invention relates to self-wetting, phenolic foams and to a method of making such foams. More particularly, the invention relates to self-wetting phenolic foam masses containing an effective surface active wetting agent rendering the foam capable of rapidly absorbing liquids.

(2) Description of the prior art

My U.S. Pat. No. 3,049,444 describes a self-wetting cellular synthetic plastic material which is impregnated with a wetting agent to improve its self-wetting properties for use as a floral foam. According to that patent, the plastic material is foamed and is then provided with passages for holding flower stems. The wetting agent is applied from the passages to impregnate the interior portion of the foam body.

A search of the prior art since the development of my present invention has revealed that surface active sulfonates have been included in phenolic materials during foaming as foam increasing agents in the production of cellular expanded thermoset resins having excellent buoyancy properties by virtue of use of the surface active agents and a peroxide foaming catalyst. The production of such a material is disclosed by Sterling in U.S. Pat. No. 2,629,698. Such foaming can also be conducted using a combination of azo compound and diisocyanate as a foaming catalyst; see Sterling in U.S. 2,608,536.

ADDITIONAL BACKGROUND INFORMATION

It has also been found that urea formaldehyde resins can be foamed to contain wetting agents by mixing the wetting agent with the urea formaldehyde resin prior to foaming and by thereafter introducing foaming catalyst to foam the mass.

SUMMARY OF THE INVENTION

This invention provides a foamed phenolic plastic having interconnected cells and containing anionic sulfonate wetting agent distributed through the plastic material of the mass and rendering the mass highly self-wetting when immersed in liquids. According to this invention, the foam can be produced by thoroughly mixing phenolic resin with a small amount of unreacted anionic sulfonate wetting agent and treating the mixture with an inorganic mineral acid as the foaming catalyst, without undue boiling or burning of the mixture, to produce the foamed phenolic product which still contains unreacted anionic sulfonate wetting agent. The anionic sulfonate wetting agent can be isolated from the phenolic and/or acid catalyst during foaming.

In a preferred method, the nonionic wetting agent and sulfonate wetting agent are added to two portions. Accordingly, one portion of the nonionic wetting agent is added followed immediately by a portion of the sulfonate wetting agent and the liquid is thoroughly mixed; then the remainder of the nonionic wetting agent is added followed immediately by the remainder of the sulfonate wetting agent and thoroughly mixed, followed by addition and mixing of the inorganic mineral acid foaming catalyst.

As a preferred feature of this invention, a mass of foam containing carbon black pigment can be converted to a pleasant mossy green color by treatment of the foam with gaseous ammonia. The ammonia also functions to neutralize residual acid catalysts, although preferably it is used only to neutralize to a pH between 6 and 7 since this pH is particularly adaptive to the preservation of flowers.

While this invention is susceptible of embodiment in many different forms, there is shown in the drawings and will be described herein in detail an embodiment of the invention with the understanding that the invention is not considered to be limited by the embodiment illustrated and described.

BRIEF DESCRIPTION OF THE DRAWINGS

FIG. 1 is a section of an embodiment of impregnated phenolic floral foam according to a preferred form of the invention; and FIG. 2 is a diagrammatic showing enlarged from FIG. 1, of a cell wall for the purpose of showing how the wetting agent can be present within the phenolic foam structure.

DESCRIPTION OF THE PREFERRED EMBODIMENTS

Referring first to the drawings, FIG. 1 illustrated a block 14 of floral foam material having passageway 16 provided therein for supporting flower stems as disclosed by my above identified patent. Sulfonate wetting agent, as indicated by the stippling at 18, is uniformly distributed throughout the block 14 of foamed cellular material and occurs at the surface of the cell walls and may occur even within the cell walls. The cells of block 14 are of the interconnected type providing flow passages from one cell to the next. As seen in FIG. 2, it is believed that the cell walls 20 of the cells in the foamed cellular structure 14 contain, interiorly and exteriorly, sulfonate wetting agent as indicated diagrammatically at 24 within or between protective material shown diagrammatically at 22 and 26 shielding the sulfonate wetting agent 24 from the phenolic of the cell wall and from any residual acid catalyst or neutralized acid catalyst as indicated diagrammatically at 28.

Examples of anionic sulfonate wetting agent are disodium dodecylated oxydibenzene sulfonate, sodium dioctyl sulfosuccinate, dibutyl sodium sulfosuccinate, dihexyl sodium sulfosuccinate, octadecyl disodium sulfosuccinate, octylnaphthalene sodium sulfonate, dodecyl benzene ethanolamine sulfonate, monobutyl phenyl-phenol sodium monosulfonate, monobutyl biphenyl sodium sulfonate, water soluble sodium salts of sulfated octanoic acid esters of naphthol and other sulfated esters, lauryl methanol sulfonate, sodium petroleum sulfonate, and other sulfonated compounds which function as anionic wetting agents and which are well known to those in the art. The nature of the sulfonate is unimportant as long as it is anionic, although disodium 4-dodecylated oxydibenzene sulfonate is especially preferred.

Briefly, the cellular mass of this invention is made by mixing the sulfonate with a liquid phenolic resin and foaming the resulting mixture with a mineral acid catalyst. Where the sulfonate is reactive toward the phenolic resin, it has been found that mixing the phenolic resin with a nonionic wetting agent prior to addition of the sulfonate isolates the sulfonate in a manner blocking any reaction. Where the sulfonate is reactive toward the mineral acid catalyst, it has been found that addition of nonionic wetting agent after addition of the sulfonate and prior to addition of the acid catalyst blocks the reaction.

Thus, in a preferred form of the present invention, the phenolic resin is mixed with about 0.1 to 5 parts by weight of nonionic wetting agent, then 0.1 to 5 percent by weight, based on phenolic resin, of the sulfonate are added and are mixed in. Another 0.1 to 5 parts by weight of nonionic wetting agent is then added followed by about 1 to 10 parts by weight of mineral acid catalyst. Although any mineral acid is useful as catalyst, the preferred mineral acids are hydrochloric acid, sulfuric acid and phosphoric acid because of their availability. The resulting foamed product is treated with ammonium to neutralize much of the residual acid from the foaming process.

The foamed product is not only self-wetting with respect to water, but also with respect to organic liquids such as kerosene, gasoline, and hydrocarbons, alcohols, ketones, and other solvents, acids, alkalis and liquified gases such as liquid oxygen, liquid nitrogen and the like. Thus, the foam material of this invention can find application in such structures as airplane fuel tanks, with the foam extending throughout the fuel tank interior and holding kerosene or the like from spilling in case of an accident or impact.

As one typical example of the manufacture of a self-wetting foam according to this invention, a small amount, about one part by weight, of Daxad (polymerized potassium salts of alkyl naphthalene sulfonic acids) was mixed for several minutes with 80 parts by weight of Bakelite phenolic resin BRL 2760 (resol phenolic resin). The Daxad was added as a dispersing agent for dispersing materials to be later added and blended into the mix. The presence of the Daxad in the mix produces a more uniform textured foam throughout after expansion and assures good density of the fine close small cells in the expanded product. 1.8 parts by weight of Tween No. 40 (polyoxyethylene sorbitan monolaurate) was added with blending for five minutes in a mixer.

The function of the Tween 40 is to improve the resilience of the foam and aid in proper expansion of the resin mix to a good textured foam after the acid catalyst has been added. I have found that mixing for about five minutes is adequate to properly disperse the Tween 40 in the mix; unduly long periods of mixing appear to reduce the wetting power of the finished foam and too little blending tends to produce a very soft, large-celled, light density foam. Within these parameters, adjustment of mixing time can be made by those in the art to suit their particular desires.

Next, 5 parts by weight of Benax 2A-1 (solution 45% active content disodium 4-dodecylated oxydibenzene-sulfonate and 55% water) was added and blended in the mix for five minutes. As in the case of the Tween 40, the mixing time can be adjusted by those in the art. The Benax 2A-1 type of sulfonated product is preferred as a wetting agent because it is extremely stable in the presence of both acid and alkali; acid is to be added as the foaming catalyst and is later to be neutralized with ammonia.

About 8 parts by weight of aged BRL phenolic resin 2759 (a resol-phenolic resin), containing carbon black as a pigment, and another 8 parts by weight of fresh BRL phenolic resin 2759 were blended into the mixture along with 6.6 parts by weight isopropyl ether and 1.8 additional parts by weight Tween 40 and mixing was carried out for about 15 to 30 minutes. It is preferred to include some partly aged resin in the mix to provide better foaming to a desired density by slowing down the curing reaction and thereby eliminating large pressure cracks in the material. After thoroughly mixing, 8 parts by weight of hydrochloric acid was added to the batch, followed by mixing for a short period of time, e.g., one minute. The mixture was then dumped in a mold.

The foamed product recovered from the mold was cut into slabs and placed in a steam-heated chamber and heated to drive off most of the acid catalyst. The heat in the chamber was cut off and small amounts of ammonia gas were introduced into the chamber for a period of about one hour. The ammonia gas readily penetrated the foam because of the partial vacuum created by previous cooling of the foam from elevated temperatures and the ammonia gas penetrates further into the foam as the foam cools further. The amount of ammonia penetrating the foam is not sufficient to react with or otherwise degrade the Benax 2A-1. The foam slabs when first cut are black in color due to the presence of the carbon black color material, but the ammonia converts the black color to a very uniform green color which is an attractive color for the florist trade.

The green foam produced above was cut into blocks and provided with passageways 16. When placed in water, the blocks absorbed water and sank quickly. Flowers were then supported by their stems in the passageways 16 and remained fresh for a considerable period of time.

As an example of the especially preferred method wherein I achieve fast wetting time and maximum water absorption in the foam product, the above typical example was repeated through the addition and mixing of the Daxad. Then the 1.8 parts by weight of the Tween No. 40 was added, followed immediately by 2.5 parts by weight of Benax 2A-1. The liquid was thoroughly mixed for several minutes and another 1.8 parts by weight of Tween No. 40 was added, again followed immediately by another 2.5 parts by weight Benax 2A-1. The mixing was continued and then the aged BRL phenolic resin 2759, carbon black, additional fresh BRL phenolic resin 2759, isopropyl ether, additional Tween 40, and hydrochloric acid catalyst were added in as in the typical example. The foam product had a much faster wetting time and higher water absorption properties than the one prepared above.

All parts and percentages given herein are by weight unless otherwise indicated.

I claim:

1. A method of producing a water absorbing hydrophilic phenolic foam of the type useful for floral displays and the like, which method comprises thoroughly mixing a liquid phenol-aldehyde resin with a small amount in the range of .1 to 5 percent by weight of unreacted anionic sulfonate wetting agent while physically isolating the resin from the sulfonate with an addition of a nonionic wetting agent to prevent reaction of the sulfonate with the resin and treating the mixture of phenol-aldehyde resin and unreacted wetting agent with an inorganic mineral acid in the absence of material boiling and burning of the mixture until the mixture has been foamed and solidified by curing and recovering the resulting foamed phenolic solidified product containing anionic sulfonate wetting agent unreacted with the phenol-aldehyde resin and mineral acid.

2. The method of claim 1 wherein said mineral acid is selected from the class consisting of hydrochloric acid, sulfuric acid and phosphoric acid.

3. The method of claim 1 wherein said amount of sulfonate wetting agent is in the range of 1½ to 3 percent by weight.

4. The method of claim 1 wherein said sulfonate wetting agent is disodium 4-dodecylated oxydibenzene sulfonate.

5. The method of claim 1 wherein said sulfonate wetting agent is sodium dioctyl sulfosuccinate.

6. The method of claim 1 wherein the addition of nonionic wetting agent is prior to adding and mixing the sulfonate wetting agent and in an amount sufficient to physically separate the phenol-aldehyde resin from the later added sulfonate wetting agent.

7. The method of claim 6 including the step of adding additional nonionic wetting agent after addition of the sulfonate wetting agent and before addition of the mineral acid in an amount physically separating said sulfonate wetting agent from the later added mineral acid.

8. The method of claim 1 wherein said resin contains carbon black pigment and including after foaming the step of treating the foam with ammonia to convert the color to green.

9. The method of claim 1 wherein the addition of a first portion of the nonionic wetting agent is prior to the addition and mixing of a portion of the sulfonate wetting agent and the addition of a second portion of the nonionic wetting agent is prior to the addition of the remainder of the sulfonate wetting agent.

10. The method of claim 9 wherein each addition of a portion of the nonionic wetting agent is followed immediately by addition of sulfonate wetting agent and thorough mixing.

11. The method of claim 10 wherein the two additions of nonionic wetting agent and sulfonate wetting agent are each approximately half of the total amounts of nonionic wetting agent and sulfonate wetting agent, respectively.

12. A method of producing green phenolic foam, which method comprises foaming and curing a mixture of phenol-aldehyde resin, carbon black, and anionic sulfonate wetting agent while physically isolating the resin from the sulfonate with an addition of a nonionic wetting agent to prevent reaction of the sulfonate with the resin and treating the resulting solid foam with ammonia gas until green throughout.

13. A mass of water absorptive cellular plastic comprising foamed and solidified phenol-aldehyde resin having interconnected cells containing at the cell walls throughout the mass anionic sulfonate wetting agent physically isolated by a nonionic wetting agent rendering the mass highly hydrophilic and quickly wet by aqueous media.

14. The mass of claim 13 wherein said anionic sulfonate wetting agent is present in an amount in the range of 1½ to 3 percent based on weight of said mass.

15. The mass of claim 13 wherein said sulfonate is reactive toward the phenolic resin and including a barrier layer of nonionic wetting agent isolating the sulfonate wetting agent from reaction with the phenolic plastic.

16. The mass of claim 15 wherein said barrier layer is nonionic wetting agent.

17. The mass of claim 13 including neutralized residual mineral acid within the foamed plastic.

18. The mass of claim 17 wherein said wetting agent is reactive toward said mineral acid and including barrier means isolating said wetting agent from said acid.

19. The mass of claim 18 wherein said barrier means is nonionic wetting agent.

20. The mass of claim 13 wherein said foamed phenolic plastic has a structure of unburned phenolic plastic cell walls defined by foaming with mineral acid catalyst and wherein said sulfonate wetting agent is sandwiched between barrier layers preventing reaction of the wetting agent with the phenolic plastic and acid.

21. The method of claim 1 wherein the addition of nonionic wetting agent is mixed with the phenol-aldehyde resin before said mixing step and including the step after said mixing step and before said treating step of adding and mixing an additional amount of nonionic wetting agent for isolating the sulfonate between the additions of nonionic wetting agent to envelop the sulfonate wetting agent and render it non-reactive to the phenol-aldehyde resin and the mineral acid.

22. In a method of producing a phenolic foam wherein a liquid phenol-aldehyde resin is cured by foaming and solidifying using an inorganic mineral acid as the curing agent, the improvement by which the foam is rendered water absorbing and useful for floral displays and the like, which improvement comprises incorporating from about 0.1 to about 5 percent by weight of an anionic sulfonate wetting agent in the phenol-aldehyde resin before curing and physically isolating the sulfonate wetting agent from the resin during the curing reaction whereby the reaction proceeds without material burning of the foam.

References Cited

UNITED STATES PATENTS

| 2,608,536 | 8/1952 | Sterling | 260—2.5 F |
|---|---|---|---|
| 2,629,698 | 2/1953 | Sterling | 260—2.5 F |
| 2,653,139 | 9/1953 | Sterling | 260—2.5 F |
| 2,753,277 | 7/1956 | Smithers | 260—2.5 F |
| 3,189,479 | 6/1965 | Coppick et al. | 260—2.5 F |

JOHN C. BLEUTGE, Primary Examiner

M. FOELAK, Assistant Examiner

U.S. Cl. X.R.

260—38, 59